T. H. RIEDER.
VULCANIZING APPARATUS.
APPLICATION FILED JAN. 9, 1911.
1,138,791.
Patented May 11, 1915.
2 SHEETS—SHEET 2.
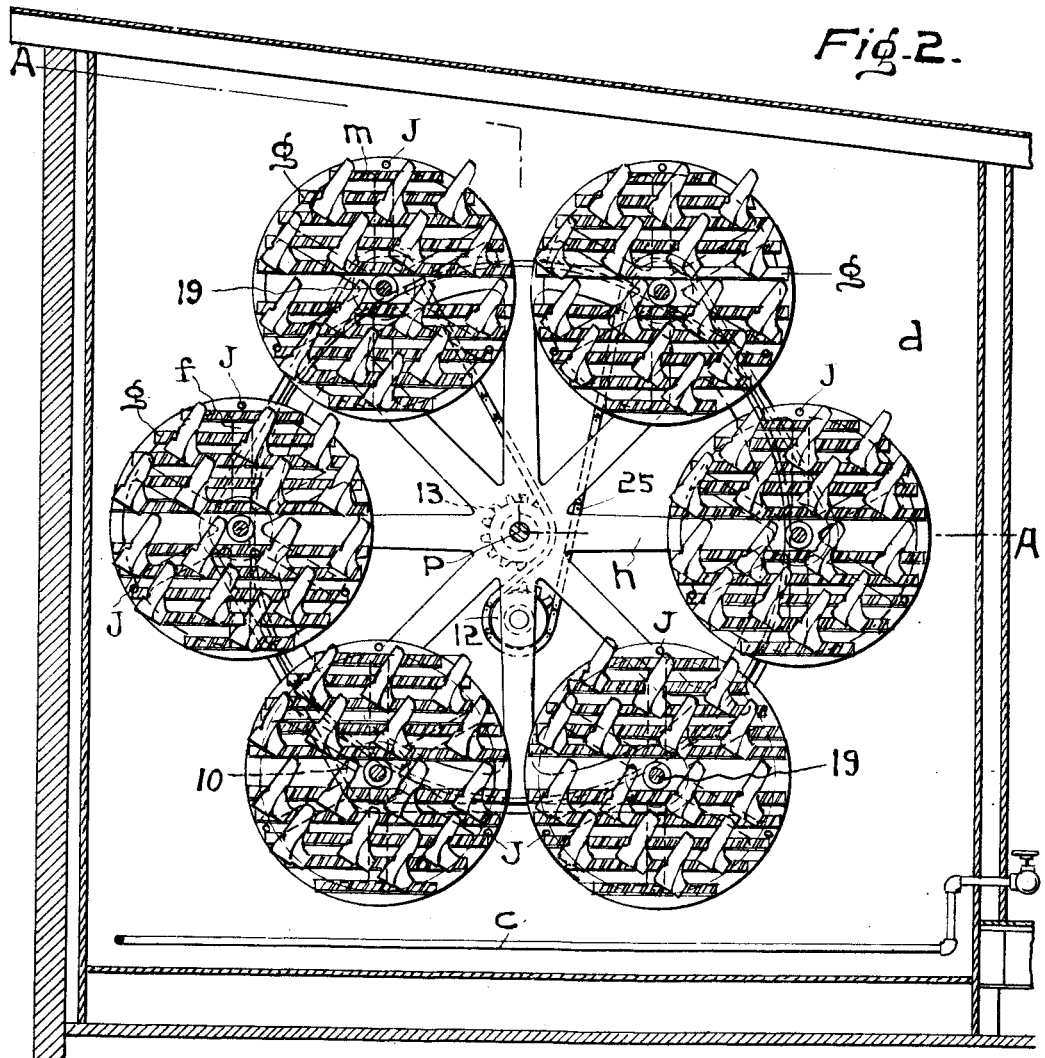
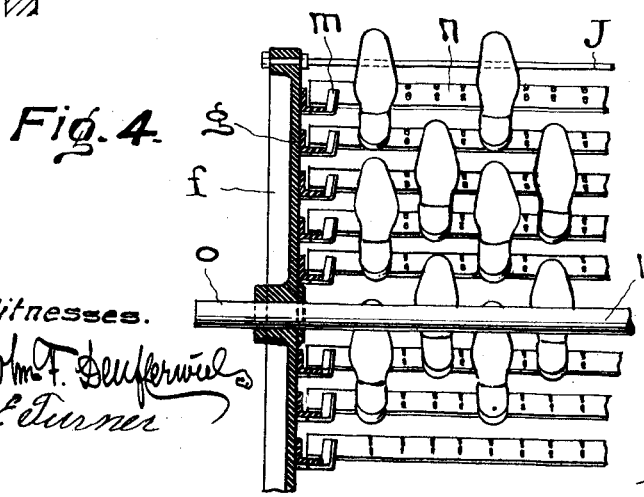
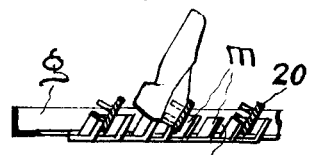

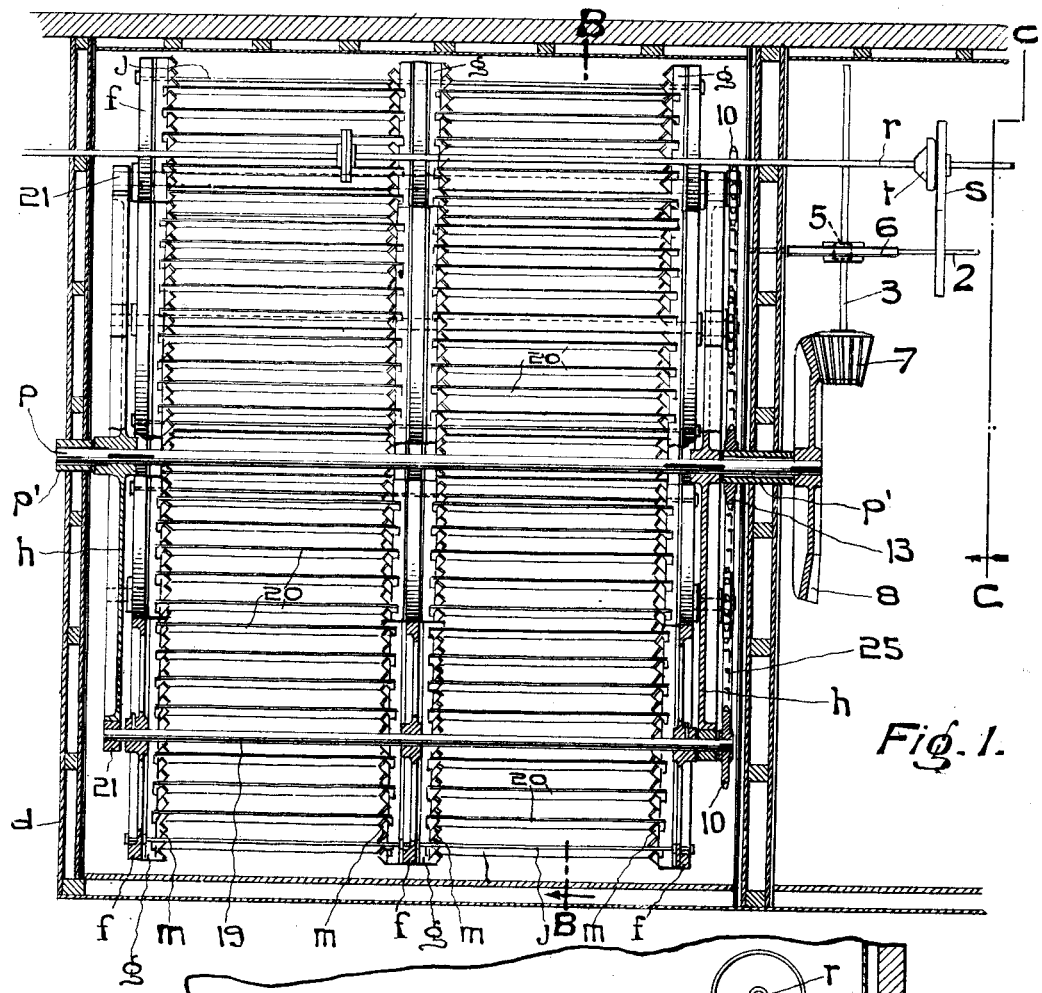
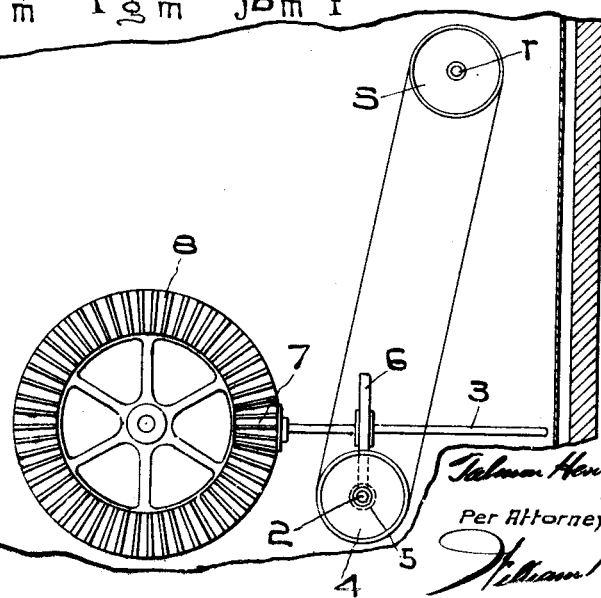

UNITED STATES PATENT OFFICE.

TALMON HENRY RIEDER, OF BERLIN, ONTARIO, CANADA, ASSIGNOR TO CANADIAN CONSOLIDATED RUBBER COMPANY, LIMITED, OF MONTREAL, CANADA, A CORPORATION.

VULCANIZING APPARATUS.

1,138,791.  Specification of Letters Patent.  Patented May 11, 1915.

Application filed January 9, 1911. Serial No. 601,692.

*To all whom it may concern:*

Be it known that I, TALMON HENRY RIEDER, a subject of the King of Great Britain, residing at No. 58 Roy street, Berlin, in the Province of Ontario, Dominion of Canada, have invented certain new and useful Improvements in Vulcanizing Apparatus; and I do hereby declare that the following is a full, clear, and exact description thereof.

My invention relates to vulcanizing machines of the type wherein a multiplicity of articles are simultaneously vulcanized while mounted on a common carrier adapted to be charged or loaded with the articles before being run into the vulcanizing chamber; and it has for its object to provide an apparatus by which articles to be vulcanized are caused to repeatedly pass from place to place while confined within the vulcanizing chamber in a manner to secure uniform vulcanization for all the articles.

The invention may be said briefly to consist of means within a closed vulcanizing chamber for causing the articles being vulcanized to move about while being subjected to the vulcanizing action for the purpose of vulcanizing all the articles uniformly.

For full comprehension of my invention, however, reference must be had to the accompanying drawings, forming a part of this specification, in which similar reference characters indicate the same parts, and wherein;

Figure 1, is a diagrammatical horizontal sectional view of my improved vulcanizing apparatus taken on line A Fig. 2; Fig. 2, is a transverse vertical sectional view, also diagrammatical, taken on line B B Fig. 1; Fig. 3, is a transverse sectional view taken on line C C Fig. 1; Fig. 4, is a detail sectional view of one end of one of the members of my apparatus; and Fig. 5 is an enlarged detail elevation of a part of the means for supporting on the movable carrier, the devices to be vulcanized.

The oven or chamber $d$ may be of any construction suitable for vulcanizing purposes and contains a heating coil $e$ regulated by a valve or other suitable thermostatic or manually controlled means. Within the oven a skeleton drum $h$ is rotatably supported and has rotatably mounted therein a series of preferably six stick carriers each comprising a series of three wheels braced together by stiffening rods. The adjacent sides of the wheels have fixed thereon a series of parallel angle iron racks $g$ each having a series of diagonally disposed straps $m$ riveted thereto and presenting between them notches $m'$ (Fig. 5) for receiving and retaining the sticks 20 upon which the lasted rubber shoes are usually set to be carried during vulcanization. These stick carriers are supported on shafts 19 presenting trunnions mounted in bearings 21 (Fig. 1) formed upon the ends of the skeleton drum.

The drum $h$ is mounted upon and keyed to a shaft $p$ extending through and supported in bearings $p'$ in the walls of the ovens; and rotation is imparted thereto through the shaft by a reduction gear operatively connecting the latter to a main driving shaft $r$. This reduction gear comprises pulley $s$ and clutch $t$ mounted upon the main shaft, a pair of horizontal counter shafts 2 and 3 suitably mounted, the former (2) having fixed thereon a pulley 4 and worm 5, and the counter shaft 3 carrying a worm-wheel 6 and a miter pinion 7, the worm wheel intermeshing with the worm, and the pinion 7 with a miter gear 8 fixedly mounted on the shaft $p$ outside of the oven.

The stick-carriers while revolving with the drums are made to maintain the sticks carried thereby and the lasts mounted on the sticks constantly in horizontal or level position, by sprocket wheels or pulleys indicated at 10, and fixed on the trunnions $o$, an idle sprocket wheel or pulley 12 mounted rotatably on one end of the drum, and a sprocket wheel or pulley 13 mounted rigidly upon the wall of the oven concentric with the shaft $p$; an endless chain 25 or belt being looped around the sprocket wheels or pulleys 10 and idler 12 and extending beneath and engaging the fixed sprocket wheel or pulley 13. Power is transmitted by any suitable means to the main driving shaft $r$.

Operation: The sticks with the lasted rubber shoes fixed thereon in the usual way are set in the notches $m'$ of the different stick carriers, the drum being, meanwhile, turned by hand to enable this to be done; and when the carriers are fully charged the power is thrown on, steam admitted to the coil, and the vulcanizing operation otherwise carried on in the usual way. By this means each article is made to repeatedly pass through the zones of the highest, medium, and lowest temperatures, and owing to the carriers being maintained constantly in horizontal or level position the sticks are prevented from displacement, while the reduction gear insures a very slow movement of the carriers.

What I claim is as follows:—

1. In a vulcanizing apparatus the combination with a heated chamber; of a rotatable drum within said chamber; means for rotating said drum; a series of annular stick carriers revolubly mounted on said drum; sticks supported by said carriers; means extending from one side of said sticks for supporting the goods to be vulcanized, said sticks being supported in open slots formed in said carriers for preventing said sticks from turning when loaded and means for holding the carriers to maintain the slots in upright position during the rotation of the drum.

2. In a vulcanizing apparatus, the combination with a heated chamber; of a rotatable drum within said chamber; means for rotating said drum; a series of annular stick carriers revolubly mounted on said drum; means for supporting the articles to be vulcanized upon said carriers; a pulley rigidly attached to the wall of said chamber; means on said carriers for engaging a belt; and an endless belt connecting said pulley and said engaging means on said stick carriers for maintaining them in a substantially level position during rotation of the drum.

3. In a vulcanizing apparatus the combination with a vulcanizing chamber, of a skeleton drum revolubly mounted within said chamber; a series of carriers journaled in the said drum; means for supporting the articles to be vulcanized upon the said carriers; pulleys fixed upon the journals of the said carriers; a pulley mounted upon the drum eccentrically relatively thereto; a pulley arranged concentrically relatively to the said drum and mounted rigidly upon a fixed part of the apparatus; and an endless belt looped over the said pulleys.

In testimony whereof, I have signed my name to this specification, in the presence of two subscribing witnesses.

TALMON HENRY RIEDER.

Witnesses:
E. NOONAN,
S. M. SPROULE.